United States Patent [19]

Henry et al.

[11] 4,211,678

[45] Jul. 8, 1980

[54] COPOLYESTER YARNS AND FIBERS DYEABLE WITHOUT CARRIER AT ATMOSPHERIC PRESSURE

[75] Inventors: Charles L. Henry, Asheville; James E. White, Candler, both of N.C.

[73] Assignee: Akzona Incorporated, Asheville, N.C.

[21] Appl. No.: 941,621

[22] Filed: Sep. 12, 1978

[51] Int. Cl.² .................. C08G 63/18; D01F 6/62; D01F 9/08
[52] U.S. Cl. .................. 260/22 D; 8/DIG. 4
[58] Field of Search .................. 260/22 D; 8/DIG. 4

[56] References Cited

U.S. PATENT DOCUMENTS

| | | | |
|---|---|---|---|
| 2,905,657 | 9/1959 | Huffman | 8/DIG. 4 |
| 3,390,108 | 6/1968 | Keck et al. | 260/7.5 |
| 3,416,952 | 12/1968 | McIntyre et al. | 428/482 |
| 3,625,754 | 12/1971 | Dunn | 260/22 D |
| 3,668,187 | 6/1972 | King et al. | 8/DIG. 4 |
| 3,975,323 | 8/1976 | Georgoudis et al. | 260/7.5 |
| 4,042,570 | 8/1977 | Bernert et al. | 528/279 |
| 4,056,356 | 11/1977 | Gilkey et al. | 8/DIG. 4 |

*Primary Examiner*—Ronald W. Griffin
*Attorney, Agent, or Firm*—Francis W. Young; Jack H. Hall

[57] ABSTRACT

The invention relates to new copolyester polymers which are high molecular weight copolyesters of terephthalic acid, ethylene glycol, dimer acid and polyoxyethylene glycols and to films, fibers and filaments made from these copolyesters. The copolyesters contain about 2 to 4% by weight of dimer acid and about 1 to 3% by weight of polyoxyethylene glycol. Fibers and yarns processed from these copolyesters have markedly improved affinity for disperse dyes.

15 Claims, No Drawings

COPOLYESTER YARNS AND FIBERS DYEABLE WITHOUT CARRIER AT ATMOSPHERIC PRESSURE

This invention relates to new copolyester polymers and to improved polyester films, fibers and filaments made therefrom.

High molecular weight polyethylene terephthalate is the most important homopolyester commercially used for the production of textile filamentary yarns and staple fibers. These yarns and fibers are used in a broad range of applications in the textile field. However, it is well known that these products can only be satisfactorily dyed with disperse dyestuffs by the use of a dye carrier and/or use of elevated temperatures, usually 120°–130° C., under super atmospheric pressure. The use of carriers is undesirable because of their cost and the problems associated with their disposal after use. Dyeing under pressure necessitates the use of expensive pressure dyeing equipment, increases energy usage, and cannot be used for blends of these products with certain natural fibers such as wool.

Modifications of polyethylene terephthalate polymer (hereinafter denoted as PET) to increase the dyeability of filaments and fibers produced therefrom are continuously being sought. These modifications must not, of course, destroy its basic desirable properties.

It is well known in the art that incorporating other structural units into the PET polymer chains will enhance the dyeability of yarns and fibers processed from the resulting copolymer. Dyeability enhancing units incorporated into the polymer chain can be derived from a variety of comonomers; for example, straight and branched chain dibasic acids, aromatic dibasic acids other than terephthalic, straight and branched chain diols, and polyoxyethylene glycols (hereinafter denoted as PEG). It is also well known that, with these systems, increasing the number of incorporated units so as to obtain satisfactory deep dyeability with disperse dyestuffs, the loss of the desirable chemical, thermal and mechanical properties of the copolymer as compared to the homopolymer is so great that the fiber or film produced thereupon is not satisfactory. Thus far, none of these approaches has resulted in a commercial product. The loss of some desirable properties are also related to the molecular weight of the comonomer; for example, the melting point of a copolymer is depressed proportionally to the mol % comonomer incorporated, not to the weight % incorporated.

It is also known that filaments and fibers prepared from a polyethylene terephthalate/polyoxyethylene terephthalate copolyester polymer can be dyed with disperse dyestuffs at atmospheric pressure and without using a carrier provided the polyoxyethylene units comprise about 5 wt % or more of the polymer. However, the incorporation of polyoxyethylene units into the polymer chain adversely affects the thermal and thermo-oxidation resistance of the resulting copolyester proportionally to the weight % incorporated. Therefore it is highly desirable that the amount of polyoxyethylene units incorporated into the polymer chains be kept below about 5 wt %.

U.S. Pat. No. 3,390,108 discloses that yarns and fibers with good thermal and mechanical properties and enhanced dyeability can be processed from a high molecular weight copolyester comprised of ethylene terephthalate and ethylene dimerate units. A preferred dimer acid disclosed is a $C_{36}$ dibasic acid substantially free of trimer acid and is incorporated into the copolymer in an amount such that the ethylene dimerate units constitute from 0.5 to 5% of the sum of the ethylene dimerate and ethylene terephthalate units. However, for yarns and fibers derived from these copolyester polymers to be easily dyed to deep shades at atmospheric pressure without a carrier, the ethylene dimerate units must be present in amounts falling in the upper part of the disclosed range. As the cost of dimer acids is high compared to the cost of the terephthalic acid, these copolyesters have economic limitations on their commercial utility in the textile field. Also for the preparation of these copolyesters, the patent only prescribes the use of free dimer acid as a reactant to provide the dimerate units. This can be a disadvantage as unesterified dimer acid in the preparative system causes agglomeration of the particles of delusterants, such as titanium dioxide ($TiO_2$), added to it. Agglomeration causes an uneven distribution and variable luster in the polymer. Furthermore, agglomerates not easily broken up can cause problems in spinning, for example, clogged spinnerets.

An object of this invention is to provide new copolyester polymer formulations which can be readily processed into filamentary yarns and fibers which are easily dyed to dark shades with disperse dyestuffs at atmospheric pressure without the use of a carrier.

Another object of this invention is the avoidance of the aforementioned disadvantage of $TiO_2$ particle agglomeration associated with the use of free dimer acid as a reactant in the preparation of copolyesters of enhanced dyeability.

It has been discovered that high molecular weight copolyester polymer comprised of:

| | |
|---|---|
| terephthalate units: | 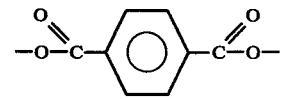 |
| ethylene units: | —CH$_2$CH$_2$— |
| dimerate units: | 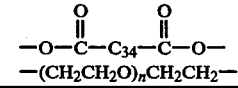 |
| polyoxyethylene units: | —(CH$_2$CH$_2$O)$_n$CH$_2$CH$_2$— | meet the above objectives provided that the polyoxyethylene units constitute about 1–3 wt % and the dimerate units constitute about 2–4 wt % of the polymer.

Copolyesters of this invention are readily prepared by the same procedures commonly employed for the preparation of PET homopolymers. They are made, if no delusterant is used, by heating together the desired quantities of dimethylterephthalate (DMT), ethylene glycol (EG) and PEG in the presence of a conventional transesterification catalyst until the evolution of methanol is complete. The desired quantity of dimer acid is then added and the resulting solution polycondensed, using conventional polycondensation catalysts, by heating at about 280°–290° C. under a high vacuum until the polymer has the desired intrinsic viscosity (IV). The same polymer can be made using DMT, EG, PEG, and a lower alkyl ester of dimer acid which is added to the preparative system before transesterification. Also, the same polymer can be made using the glycol ester of dimer acid which can be added either before or after transesterification. Alternatively, the same polymer can be made with terephthalic acid, EG, PEG and dimer acid.

Delustered copolyesters of this invention can be made in several ways in which the agglomeration of $TiO_2$ particles can be avoided. The preferred method is the use of bishydroxyethyl dimerate (BHED) instead of dimer acid. Alternately, a lower alkyl ester of dimer acid may be used. In the preferred case, DMT, EG, PEG, BHED and a transesterification catalyst are heated together until transesterification is complete. A suspension of $TiO_2$ in ethylene glycol is then added and the mixture polycondensed until the resulting polymer has the desired I.V. Alternately, a mixture of DMT, EG and PEG can be transesterified, and then the $TiO_2$ and BHED added.

Delustered copolyesters of this invention can be satisfactorily made using DMT, EG, PEG and dimer acid as reactants provided that the normal preparative procedure is modified so that the dimer acid is converted in situ into its glycol and polyoxyethylene glycol esters before the suspension of $TiO_2$ is added. In this case a mixture of DMT, EG and PEG is transesterified, the dimer acid added and the reation mass polycondensed until substantially all of the dimer acid groups have been esterified. The $TiO_2$ suspension can then be added to the system without an unacceptable agglomeration of the $TiO_2$ particles.

Dimer acids useful in the practice of this invention are commercially made by dimerization of unsaturated long chain monobasic acid molecules, followed by hydrogenation of residual unsaturated bonds and purification by molecular distillation. The preferred dimer acid is a $C_{36}$ dibasic acid essentially free of unsaturated bonds and containing about 3-6% trimer acid, which can be prepared from unsaturated acids such as $C_{18}$ fatty acids (linoleic and linolenic). This dimer acid can be readily converted into BHED by heating it with EG, without a catalyst, until the theoretical amount of water has been fractionated off.

Polyoxyethylene glycols (PEG) useful in the practice of this invention are commercially made by polymerization of ethylene oxide. They are commercially available in a wide range of molecular weights at a cost substantially lower than that of saturated and purified dimer acids. A wide range of molecular weights of polyoxyethylene glycols from 500 to 4,000 can be used.

A major feature of this invention is that the combination of dimerate and polyoxyethylene units in the copolyester polymer enhances the dyeability of yarns and fibers processed therefrom to an unexpectedly high degree. Compared on an equal weight basis, the dimerate/polyoxyethylene combination is significantly superior to dimerate units alone in imparting enhanced dyeability. Further, as only about 1-3 wt % polyoxyethylene units are needed, the thermal and thermo-oxidation resistance of the polymer is maintained at a satisfactory level. Through the use of the invention a significant cost advantage is achieved over the use of dimer acid alone.

Copolyester polymers made according to this invention can be spun into filamentary yarns using the same processes as conventionally used for PET homopolymer. These yarns can then be processed into normal (flat) or textured yarns or staple fiber with good mechanical properties by conventional processes.

The following examples are set forth to illustrate the invention:

EXAMPLE I

Copolyester polymers were prepared using the reactants shown in Table I. Polymer 1 and 2 were made by charging the stated quantities of DMT, EG and polyoxyethylene glycol having a molecular weight of 1000 (PEG-1000) into a one liter reaction kettle. After addition of 0.03 mol % manganous benzoate, the mixture was heated under a nitrogen atmosphere to melt the solids and then, with stirring to 210°-215° C. while fractionating off the methnol liberated. Upon completion of the transesterification, 0.05 mol % antimony tributylate, a phosphate stabilizer (50 ppm P) and the stated quantities of dimer acid were added and the reaction mass transferred to a polycondensation vessel. With stirring and a programmed application of a high vacuum, the reacting mass was heated to and maintained at 280° C. until the intrinsic viscosity of the resulting copolyester polymer was about 0.6. The polymer was then extruded from the vessel, ground up and dried. Polymer 3 was made by charging the transesterification kettle with the stated quantities of DMT and EG and 0.03 mol % manganous benzoate and carrying out transesterification as for Polymer 1. The stated quantity of DA (Empol 1010 dimer acid) was then added along with 0.05 mol % antimony tributylate and the phosphate stabilizer. The resulting reaction mass was then polycondensed, extruded ground up and dried by the same procedure as used for Polymer 1.

TABLE I

| Polymer Sample No. | DMT Gms. | DMT Wt %* | DA** Gms. | DA** Wt %* | EG Ml. | PEG-1000 Gms. | PEG-1000 Wt %* | Polymer DTA $T_m$, °C. |
|---|---|---|---|---|---|---|---|---|
| 1 | 279 | 93.0 | 9 | 3.0 | 201 | 12 | 4.0 | 247 |
| 2 | 282 | 94.0 | 12 | 4.0 | 203 | 6 | 2.0 | 249 |
| 3 (Control) | 282 | 94.0 | 18 | 6.0 | 203 | — | — | 247 |

*Based on the sum of the weights of the reactants excluding EG
**Empol 1010 dimer acid containing about 3% trimer Each of the polymer samples were spun at 285°-295° C. into a 6 filament yarn at 396 meters/minute. After drawing these yarns about 4 times their original lengths, each yarn was about 30 denier.

Each yarn sample was knit into a hose and the dyeability of each hose sample evaluated with 4 disperse dyestuffs by the procedures given below. All dyeings were performed at atmospheric pressure and without a carrier.

The hose samples were scoured by putting them in an aqueous solution of 1 g/l Merpol HCS (an ethylene oxide condensate sold by the DuPont Company) and 1 g/l caustic soda, heating to 80° C., and then adding 2 g/l sodium hydrosulfite. After 20 minutes at 80° C., the hoses were washed free of the scouring solution.

A part of each scoured hose was dyed separately with 1.0% owf Eastman Polyester Yellow W-Disperse Yellow 42, with 0.5% Eastman Polyester Brillant Red FFBL-Disperse Red 60, and with 1.0% owf Eastman Polyester Blue GLF-Disperse Blue 27. In addition to the dyestuff, each dyebath contained 0.5 g/l Tanapal ME (anionic surfactant sold by Tanatex Chemical Corporation) and formic acid to adjust the pH to 5.0 at 70° C. Each dyebath and hose sample (40:1 ratio) was heated from 70° C. to the boil during 30 minutes and then kept at the boil for one hour. After rinsing, each dyed hose was after scoured for 20 minutes in an aqueous bath of 0.25 g/l Tanapon X-70 (a modified polyglycol ether sold by Tanatex Chemical Corporation) and 0.25 g/l soda ash, and then rinsed free of this solution. After each dyeing, the percent dyestuff exhausted from the dyebath was determined. Results are listed in Table II.

A dyeing rate for each scoured hose sample was determined as follows. A dyebath was prepared containing 1.5 owf Resolin Blue FBLD, 0.5 g/l Tanapal ME, 0.1 g/l DS-14 and sufficient formic acid to adjust pH to 5.0 at 70° C. The dyebath and hose sample (50:1 ratio) was held at 70° C. for 10 minutes, heated to the boil during 30 minutes and then held at the boil for 80 minutes. During this operation, the percent dyebath exhaustion was determined as a function of time. Comparative results are shown in Table II.

A dye saturation value for each scoured hose sample was determined as follows. A dyebath was prepared containing 8.0% owf Resolin Blue FBLD, 0.5 g/l Tanapal ME, 0.1 g/l DS-14 and acetic acid to adjust pH to 5.0 at 70° C. The dyebath and hose sample (200:1 ratio) was heated to the boil during 30–45 minutes and then held at the boil for 3 hours. The dyed hose was then washed, after scoured, washed, treated with dilute acetic acid, washed and dried. The % dye in the dyed hose was then determined. Results are listed in Table II.

TABLE II

| Sample No. | Dyebath Exhaustion, % | | | Dye Saturation Value - % Dye on Sample | Comparative Dyeing Rate* |
|---|---|---|---|---|---|
| | $D_1$ | $D_2$ | $D_3$ | | |
| 1 | 90 | 95 | 93 | 3.68 | ++ |
| 2 | 88 | 96 | 90 | 3.22 | ++ |
| 3 (control) | 90 | 96 | 88 | 2.45 | o |

$D_1$ = Disperse Yellow 42.
$D_2$ = Disperse Red 60.
$D_3$ = Disperse Blue 27
o = arbitrary standard.
+ = somewhat faster dyeing rate.
++ = significantly faster dyeing rate
− = somewhat slower dyeing rate.
−− = significantly slower dyeing rate Data in Table II shows that samples 1 and 2 containing a combination of dimerate and polyoxyethylene units had significantly better dyeability than with dimerate alone. Comparison of sample 2 with sample 3 shows that a 6 wt % combination of dimerate and polyoxyethylene units imparts markedly greater dyeability than 6 wt % dimerate units alone.

The heat stability of each yarn was tested by heating in a forced air oven at 180° C. for 60 minutes. The UV light stability was tested by exposing each yarn 80 hours in a Carbon-Arc Fade-Ometer. Results are shown in Table III.

TABLE III

| Sample No. | Original Tenacity, g/d | UV Light Stability, % Tenacity Retained | Heat Stability, % Tenacity Retained |
|---|---|---|---|
| 1 | 3.8 | 79 | 49 |
| 2 | 4.3 | 83 | 59 |
| 3 (control) | 3.8 | 84 | 73 |

As seen in Table III, the heat stability of yarn sample 1 was significantly lower than that of the control. Also it developed the deepest discoloration, a light yellow color. Thus, a low resistance to thermo-oxidation is indicated for this sample which contained 4 wt % polyoxyethylene units. For this reason, a maximum of 3 wt % of polyoxyethylene units is preferred. The stability shown by Sample 2, although lower than the control, is considered adequate for many applications, for example, footwear.

EXAMPLE II

Two copolyester polymers were made on pilot scale with reactants, compositions and properties listed in Table IV. Polymer sample 1 was made by heating the stated quantities of DMT, polyoxyethylene glycol and EG under a nitrogen blanket to 140° C. to melt the DMT. The resulting mixture was then transferred to a transesterification vessel and 0.03 mole % manganous benzoate and 0.05 mole % antimony glycol oxide added. The temperature was then slowly increased to about 205° C. while fractionating off the liberated methanol. After completion of the transesterification, 0.1% $TiO_2$ was added, followed by the stated quantity of Empol 1010 dimer acid. The temperature was then increased to 268° C. to distill off part of the EG. The reaction mass was then transferred to a polycondensation vessel, a phosphate stabilizer added (70 ppm P), the temperature increased to 280° C. while applying a high vacuum, and then maintained at 280° C. until the polymer had an IV of 0.69.

Polymer sample 2 was made in a similar manner except no PEG-1000 was used.

The two polymers were spun and drawtwisted into 150/32 flat yarns by conventional processes. Part of each yarn was processed into a textured stretch yarn on an ARCT 400 falsetwist machine. Yarn properties are listed in Table V.

TABLE IV

| Polymer Sample No. | EG, Lbs. | DMT | | DA* | | PEG-1000 | | Polymer IV | Polymer DTA $T_m$,** °C. |
|---|---|---|---|---|---|---|---|---|---|
| | | Lbs. | Wt% | Lbs. | Wt% | Lbs. | Wt% | | |
| 1 | 71.0 | 103.4 | 94.0 | 3.3 | 3.0 | 3.3 | 3.0 | 0.69 | 251 |
| 2 | 71.4 | 103.4 | 94.0 | 6.6 | 6.0 | — | — | 0.69 | 250 |

*Empol 1010 dimer acid containing about 3% trimer acid
**Differential Thermal Analysis

TABLE V

| Yarn Sample No. | Yarn Type | Yarn IV | Yarn Tenacity, g/d | Yarn Elong. % | Boiling Water Shrinkage, % | Yarn Heat Stability* |
|---|---|---|---|---|---|---|
| 1 | Flat | 0.63 | 4.7 | 25 | — | 70 |

TABLE V-continued

| Yarn Sample No. | Yarn Type | Yarn IV | Yarn Tenacity, g/d | Yarn Elong. % | Boiling Water Shrinkage, % | Yarn Heat Stability* |
| --- | --- | --- | --- | --- | --- | --- |
| | Textured | — | 4.4 | 22 | 6.5 | — |
| 2 | Flat | 0.64 | 4.7 | 25 | — | 78 |
| | Textured | — | 4.5 | 25 | 6.7 | — |

*% tenacity retained after heating in a forced air oven at 180° C. for 60 minutes.

The flat and textured yarns were knit into hoses and the hoses evaluated for dyeability with disperse dyestuffs by the procedures enumerated in Example I except that the dye saturation values were determined by heating for 2 hours at the boil. Results are listed in Table VI.

TABLE VI

| Sample No. | Type Yarn | Dyebath Exhaustion, % | | | Dye Saturation Value, % Dye on Sample* | Relative Dyeability |
| --- | --- | --- | --- | --- | --- | --- |
| | | $D_1$ | $D_2$ | $D_3$ | | |
| 1 | Flat | 79 | 96 | 89 | 2.07 | Highest |
| | Textured | 80 | 97 | 90 | 2.57 | |
| 2 | Flat | 73 | 95 | 82 | 1.60 | Lowest |
| | Textured | 79 | 97 | 87 | 2.09 | |

*PET homopolymer yarn dyed under same conditions with 15% owf (basis: weight of fabric) Carolid 3F carrier had a dye saturation value of 2.20%.

EXAMPLE III

On a pilot plant scale, 3 wt % dimerate/3 wt % polyoxyethylene/PET copolyester polymer was made as sample 1 in Example II (Table IV), except that 0.35% TiO$_2$ was added, as a suspension in EG, after polycondensation had progressed to such a point that the free dimer acid had been converted to situ to its glycol and polyoxyethylene glycol esters. Using conventional processes, this polymer was converted into the following yarns.

Sample 1: Drawtextured 80/32 yarn. Spun at 2000 meters/minute.

Sample 2: 70/32 flat yarn. Spun at 1200 meters/minute.

Sample 3: Textured 150/96 yarn. Spun at 1400 meters/minute.

Fabric knit from sample 1 yarns was easily dyed to dark shades with a broad range of disperse dyestuffs at the boil at atmospheric pressure without a carrier. Further, hoses knit from samples 2 and 3 and hoses knit from two corresponding PET homopolymer yarns (1) 70/32 flat; (2) textured 150/96 were dyed, without carrier, at 97° C. and 120° C. in black, navy and dark brown colors using the following dye formulas:

Black: 7.5% Foron Black SK Paste 100%

Navy: 5.94% Sodyecron Navy Blues RES Paste 50% 3.26% Resolin Blue GRL Paste 50% 1.15% Resolin Brillant Red BLS Paste 50% 0.132% Mayester Orange 3 GLL Paste 50%

Dark Brown: 3.73% Mayester Orange 3 GLL Paste 50% 1.84% Foron Blue S-BGL Paste 100% 0.746% Bucron Red KTNS Paste 100% 0.33% Samaron Yellow GGSL Paste 50%

The dyeing and dyefastness properties of samples 2 and 3 dyed at 97° C. (atmospheric pressure) were comparable to the homopolymer samples dyed at 120° C. under a super atmospheric pressure of about 2 atmospheres.

EXAMPLE IV

A 2.0 wt % dimerate/3.0 wt % polyoxyethylene/PET copolyester polymer and a 3.0 wt % dimerate/3.0 wt % polyoxyethylene/PET copolyester polymer were made in a conventional polyester pilot plant using the following components and conditions.

| | 2.0 wt % DA/ 3.0 wt % PEG-1000/PET | 3.0 wt % DA/ 3.0 wt % PEG-1000/PET |
| --- | --- | --- |
| DMT, lbs | 104.5 | 103.4 |
| EG, lbs | 72.0 | 71.0 |
| Empol 1010 dimer acid, lbs | 2.2 | 3.3 |
| Polyethylene glycol-1000, lbs | 3.3 | 3.3 |
| Manganese acetate, ppm Mn | 72 | 72 |
| Antimony glycol oxide, ppm Sb | 320 | 320 |
| TiO$_2$ % | 0.35 | 0.35 |
| Polycondensation temp., °C. | 290 | 290 |

The DTA melting point of the 2.0 wt % DA/3.0 wt % PEG-1000/PET polymer was 252° C., the other one 250° C.

These polymers were spun into 64 filament yarns at 2000 meters/minute. Part of each yarn was drawtwisted into a flat yarn using a 2.40:1 draw ratio, and part of each yarn was drawtwisted into a stretch yarn using a 2.30:1 draw ratio. Properties of these yarns are exhibited in Table VII.

TABLE VII

| Yarn | IV | Denier | Tenacity, g/d | Elongation, % | Boiling Water Shrinkage, % |
| --- | --- | --- | --- | --- | --- |
| 2% DA/3%PEG/PET | | | | | |
| Flat | 0.67 | 103 | 5.1 | 28 | 11.3 |
| Textured | 0.67 | 117 | 3.5 | 23 | 4.5 |
| 3% DA/3%PEG/PET | | | | | |
| Flat | 0.66 | 102 | 4.8 | 25 | — |
| Textured | 0.66 | 117 | 3.2 | 19 | 4.8 |

These yarns were knit into fabrics and the fabrics dyed at the boil at atmospheric pressure, without a carrier, to light and medium shades with 0.05 and 0.25% Eastman Polyester Yellow GLW, with 0.05 and 0.25% Diperse Yellow 42, with 0.05 and 0.25% Eastman Polyester Brillant Red FFBL, with 0.05 and 0.25% Disperse Red 60, with 0.05 and 0.25% Eastman Polyester Blue GLF, and with 0.05 and 0.25% Disperse Blue 27. Visual observation of the dyed fabrics showed no discernible difference in the depth of shades between the fabrics derived from the 2.0% DA/3.0% PEG-1000/PET polymer and those from the 3.0% DA/3.0% PEG-1000/PET polymer.

EXAMPLE V

Twenty-five thousand pounds of semi-dull 2.75 weight % EMPOL 1010 dimerate/3.0 weight % polyoxyethylene/PET copolyester polymer was made batchwise on a plant scale without difficulty using bishydroxyethyl dimerate (BHED) in place of the free acid. For each batch, DMT (60.43 parts), EG (35.60 parts), BHED (2.03 parts), PEG-1000 (1.94 parts) were charged into a transesterification vessel along with manganous acetate (72 ppm Mn) and antimony glycol oxide (320 ppm Sb). After heating this mixture until transesterification was complete, 0.35% TiO$_2$ was added and then the temperature increased to about 268° C. to distill off part of the glycol. The reaction mass was then transferred to an autoclave and condensed until the resulting polymer had an IV of 0.69. TiO$_2$ distribution was uniform. Part of the polymer was spun into 64 filament yarn at 2,200 mpm and then drawtextured into 110 denier yarn. Two ends of this yarn were combined and resulting 220/128 textured yarn was knit into a fabric. The fabric was then dyed in a dyebath containing the following disperse dyestuffs:

4.2% Resolin Blue BL
0.63% Palanil Yellow 3G
1.0% Latyl Cerise N
2.0% Duranol Black TA The fabric was dyed to a dark navy blue in this dyebath after 30 minutes at the boil at atmospheric pressure.

EXAMPLE VI

Using conventional pilot plant equipment, a copolyester polymer was made similar to Polymer 1 of Example II except that 0.035% TiO$_2$ was added after transesterification, followed by addition of free dimer acid. The dimer acid agglomerated the TiO$_2$ particles to such an extent that the polymer was unusable.

To avoid the agglomeration of the TiO$_2$ particles by the free dimer acid, two semi-dull 2.75 weight % dimerate/30 weight % polyoxyethylene/PET copolyester polymers were made using bishydroxyethyl dimerate (BHED) in place of the free acid. For one polymer, the BHED was added after transesterification along with the addition of 0.35% TiO$_2$. In the other polymer, the BHED was added to the DMT and EG before transesterification and the TiO$_2$ was added after transesterification. In both cases, distribution of TiO$_2$ particles was satisfactory.

EXAMPLE VII (Comparative)

A series of copolyester polymers were prepared in the same manner as Example I except that various materials were used as the second comonomer instead of polyoxyethylene glycol using the amounts shown in Table VIII. The procedure was modified in polymer samples 5-8 by adding the adipic acid together with the dimer acid, after transesterification.

Each polymer sample was spun, drawn and knit into a hose and each hose sample evaluated with 4 disperse dyestuffs by the same procedures as was done to Samples 1 and 2 of Example I. The results are listed in Table IX.

TABLE VIII

| Polymer Sample No. | DMT Gms. | DMT Wt %* | DA** Gms. | DA** Wt %* | EG, Ml. | SECOND COMONOMER Gms. | SECOND COMONOMER Wt %* | SECOND COMONOMER Composition | Polymer DTA $T_m$, °C. |
|---|---|---|---|---|---|---|---|---|---|
| 1 | 276 | 91.1 | — | — | 216 | 26.8 | 8.9 | CH$_3$OC(CH$_2$)$_7$COCH$_3$ Dimethyl Azelate | 236 |
| 2 | 279 | 93.0 | 12 | 4.0 | 206 | 9 | 3.0 | Dimethyl Isophthalate | 244 |
| 3 | 279 | 93.0 | 9 | 3.0 | 210 | 12 | 4.0 | Dimethyl Isophthalate | 239 |
| 4 | 282 | 94.0 | 12 | 4.0 | 206 | 6 | 2.0 | Dimethyl Isophthalate | 247 |
| 5 | 282 | 94.0 | 12 | 4.0 | 204 | 6 | 2.0 | HOOC(CH$_2$)$_4$COOH Adipic Acid | 245 |
| 6 | 279 | 93.0 | 12 | 4.0 | 201 | 9 | 3.0 | HOOC(CH$_2$)$_4$COOH Adipic Acid | 241 |
| 7 | 282 | 94.0 | 9 | 3.0 | 206 | 9 | 3.0 | HOOC(CH$_2$)$_4$COOH Adipic Acid | 243 |
| 8 | 279 | 93.0 | 9 | 3.0 | 201 | 12 | 4.0 | HOOC(CH$_2$)$_4$COOH Adipic Acid | 238 |
| 9 | 282 | 94.0 | 12 | 4.0 | 216 | 6 | 2.0 | Dimethyl 1,4-cyclohexanedicarboxylate | 245 |

TABLE VIII-continued

| Polymer Sample No. | DMT Gms. | DMT Wt %* | DA** Gms. | DA** Wt %* | EG, Ml. | SECOND COMONOMER Gms. | SECOND COMONOMER Wt %* | SECOND COMONOMER Composition | Polymer DTA $T_m$, °C. |
|---|---|---|---|---|---|---|---|---|---|
| 10 | 279 | 93.0 | 12 | 4.0 | 201 | 9 | 3.0 | 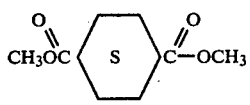 Dimethyl 1,4-cyclohexanedicarboxylate | — |

*Based on the sum of the weights of the reactants excluding EG,
**Empol 1010 Dimer Acid containing about 3% Trimer

TABLE IX

| Sample No. | Dyebath Exhaustion, % $D_1$ | $D_2$ | $D_3$ | Dye Saturation Value - % Dye on Sample | Comparative Dyeing Rate* |
|---|---|---|---|---|---|
| 1 | 87 | 94 | 88 | 2.59 | + |
| 2 | 77 | 90 | 82 | 2.41 | — |
| 3 | 79 | 95 | 86 | 2.17 | — — |
| 4 | 78 | 95 | 86 | 2.05 | — — |
| 5 | 90 | 95 | 90 | 2.46 | o |
| 6 | 90 | 95 | 89 | 2.98 | + |
| 7 | 86 | 95 | 87 | 2.20 | o |
| 8 | 89 | 94 | 90 | 3.02 | + |
| 9 | 88 | 94 | 87 | 2.40 | o |
| 10 | 86 | 96 | 86 | 2.24 | o |

$D_1$ = Disperse Yellow 42.
$D_2$ = Disperse Red 60.
$D_3$ = Disperse Blue 27.
*o = arbitrary standard.
+ = somewhat faster dyeing rate.
++ = significantly faster dyeing rate
— = somewhat slower dyeing rate.
— — = significantly slower dyeing rate.

Comparison of results in Table II with those in Table IX shows that the combination of dimerate and polyoxyethylene units imparts greater dyeability than combinations of dimerate and other structural units.

EXAMPLE VIII

Using procedures comparable to those described in Example I, a series of dimerate/PET and dimerate/polyoxyethylene/PET copolyester polymers were prepared and processed into 6 filament yarns. Quantities and reactants used for preparing the polymers are shown in Table X.

TABLE X

| Polymer Sample No. | DMT Gms | DMT Wt %* | DA** Gms | DA** Wt %* | PEG MW*** | PEG Gms | PEG Wt% | EG Ml |
|---|---|---|---|---|---|---|---|---|
| 1 | 282 | 94 | 18 | 6 | — | — | — | 203 |
| 2 | 276 | 92 | 24 | 8 | — | — | — | 200 |
| 3 | 288 | 96 | 6 | 2 | 600 | 6 | 2 | 207 |
| 4 | 285 | 95 | 12 | 4 | 1000 | 3 | 1 | 205 |
| 5 | 282 | 94 | 9 | 3 | 4000 | 9 | 3 | 203 |

*Based on the sum of the reactants excluding EG
**Empol 1010 dimer acid containing about 3% trimer
***Molecular weight.

The yarns processed from these polymers were knit into hoses and each hose sample evaluated for dyeability with 4 disperse dyestuffs by the procedures described in Example 1 except that the dye saturation values were determined by heating for 2 hours at the boil. Results are shown in Table XI.

TABLE XI

| Polymer Sample No. | Dyebath Exhaustion, % $D_1$ | $D_2$ | $D_3$ | Dye Saturation Value - % Dye on Sample | Comparative Dyeing Rate |
|---|---|---|---|---|---|
| 1 | 54 | 81 | 71 | 2.16 | o |
| 2 | 70 | 87 | 75 | 2.65 | + |
| 3 | 57 | 77 | 49 | 2.05 | — |
| 4 | 67 | 76 | 66 | 2.55 | o |
| 5 | 58 | 82 | 78 | 3.49 | + |

$D_1$ = Disperse Yellow 42.
$D_2$ = Disperse Red 60.
$D_3$ = Disperse Blue 27.
o = arbitrary stardard.
+ = faster dyeing rate.
— = slower dyeing rate.

For samples 3, 4 and 5, the data in Table XI shows that polyoxyethylene units in combination with dimerate units enhances dyeability mainly as a function of the combined weight percents of these units and not of the molecular weights of the polyoxyethylene units. Comparison of sample 4 with sample 1 demonstrates the effectiveness of as little as 1 wt % polyoxyethylene units in combination with dimerate units. Comparison of sample 5 with samples 1 and 2 shows that a combination of 3 wt % dimerate and 3 wt % polyoxyethylene units enhances dyeability more than 6 wt % dimerate units alone, and increases the dye saturation value more than 8 wt % dimer acid units alone.

What is claimed is:

1. A copolyester of terephthalic acid, ethylene glycol, dimer acid and polyoxyethylene glycol containing from about 2 to about 4% by weight of dimerate units based on the weight of the polymer and from about 1 to about 3% by weight of polyoxyethylene units based on said polymer weight.

2. The copolyester of claim 1 wherein the dimer acid is a dimer of a $C_{18}$ acid.

3. The copolyester of claim 1 containing about 2–3% by weight polyoxyethylene glycol.

4. A high molecular weight copolyester polymer comprised of terephthalate, ethylene, dimerate and polyoxyethylene units wherein the dimerate units comprise about 2 to about 4% by weight and the polyoxyethylene units comprise about 1 to about 3% by weight of the polymer.

5. The copolyester polymers of claim 4 wherein the dimerate units are derived from a hydrogenated and distilled dimer acid.

6. The copolyester polymer of claim 5 delustered with a uniform dispersion of fine particles of $TiO_2$.

7. The copolyester polymers of claims 5 or 6 wherein the dimerate units are derived from an ester of said dimer acid.

8. The copolyester polymers of claim 7 wherein the dimerate units are derived from the ethylene glycol ester of said dimer acid.

9. The copolyester polymers of claim 5 wherein the dimerate units are derived from a $C_{36}$ dibasic dimer acid.

10. The copolyester polymers of claim 4 wherein the polyoxyethylene units have an average molecular weight of about 500 to about 4,000.

11. The copolyesters of claim 10 wherein the polyoxyethylene units have an average molecular weight of about 1,000.

12. The method of preparing the copolyester polymer of claim 6 using hydrogenated and distilled $C_{36}$ dibasic dimer acid which comprises first forming a mixture of ethylene glycol and polyoxyethylene glycol esters of terephthalic acid, adding to this mixture the said dimer acid, polycondensing this mixture until substantially all of the dimer acid groups have been esterified, and then adding the $TiO_2$, followed by continued polycondensation until the resulting polymer has the desired intrinse viscosity.

13. The copolyester of claim 12 wherein said dimer acid reactant is added as the ester.

14. The copolyester of claim 12 wherein said ester of dimer acid is bishydroxyethyldimerate.

15. Oriented fibers and yarns having improved dyeability with disperse dyestuffs comprising the copolyester polymers of claims 4 or 6.

* * * * *